United States Patent [19]
Gittins et al.

[11] Patent Number: 6,052,372
[45] Date of Patent: Apr. 18, 2000

[54] METHOD AND APPARATUS FOR ESTABLISHING COMMUNICATION

[75] Inventors: Christopher J. Gittins, Felixstowe; Stephan Harris, Woodbridge, both of United Kingdom

[73] Assignee: British Telecommunications public limited company, London, United Kingdom

[21] Appl. No.: 08/744,864

[22] Filed: Nov. 7, 1996

[30] Foreign Application Priority Data

Feb. 14, 1996 [GB] United Kingdom .................. 9603020

[51] Int. Cl.[7] ............................. H04L 12/28; H04L 12/56
[52] U.S. Cl. .......................... 370/396; 370/401; 379/213
[58] Field of Search ..................... 370/351, 352, 370/353–356, 389, 392, 395, 396, 428, 429, 401, 402, 400; 379/209, 210, 211, 212, 213, 218, 220, 221

[56] References Cited

U.S. PATENT DOCUMENTS

| 5,239,577 | 8/1993 | Bates et al. ............................. 379/213 |
| 5,410,543 | 4/1995 | Seitz et al. .......................... 340/825.07 |
| 5,509,062 | 4/1996 | Carlsen ................................... 379/210 |
| 5,732,132 | 3/1998 | Hamada ................................. 379/354 |
| 5,805,587 | 9/1998 | Norris et al. ........................... 370/352 |
| 5,883,950 | 3/1999 | Sonnenberg ............................ 379/220 |

OTHER PUBLICATIONS

Claffy et al, "Location Transparent Connection Management: A Survey of Protocol Issues", 11th Annual International Phoenix Conference on Computers and Communications, Mar. 1, 1992, Scottsdale, US, pp. 272–279.

Mogul, "The Case For Persistent–Connection HTTP", Computer Communications Review, vol. 25, No. 4, Oct. 1995, New York, US, pp. 299–313.

Comer et al, "Uniform Access to Internet Directory Services", Computer Communications Review, vol. 20, No. 4, Sep. 1990, New York, US, pp. 50–59.

*Primary Examiner*—Ajit Patel
*Attorney, Agent, or Firm*—Nixon & Vanderhye P.C.

[57] ABSTRACT

Communications are established between a source user (305) and a destination user (307). Data is transmitted between these users in packets (204) having a destination address (205) and communication data (206). A destination name is identified in a first packet and this packet is transmitted to a service control platform (301) identifying, in its communication data, a destination name. A packet is then returned from the control platform (301) to the originating source (305) identifying a real contactable address for the identified destination (307). Subsequent packets of data are generated at the source (305) for transmission to the destination (307) wherein the transmitted packets have the actual destination address, as returned from the service platform, appended thereto.

21 Claims, 7 Drawing Sheets

METHOD AND APPARATUS FOR ESTABLISHING COMMUNICATION

The present invention relates to establishing communications between a source user and a destination user.

INTRODUCTION

Traditionally, communication between remote terminals has relied upon dedicated leased lines or upon the use of public switched networks, originally the analog speech-based public switched telephone network. The subsequent digitization of trunk networks facilitated the provision of switched digital communication channels and the adoption of international standards, such as the integrated services digital network (ISDN). Recently, the availability of data services has increased dramatically by the expansion and availability of the Internet, whereby data communication may be effected over large distances by means of a local call to an Internet service provider. In addition to increasing the demand for data services, access to the Internet has also encouraged many users to equip personal computers and similar computing engines with data communication devices, such as modems, thereby further encouraging new advances in the provision of increased data rate transmission over voice-based transmission channels.

Requirements for data transmission in addition to conventional voice-and-facsimile transmission, were also acknowledged when new digital transmission standards were established for mobile communications, such as GSM, which provides enhanced transmission protocols for communicating data, generally involving greater levels of interleaving, so as to reduce data loss created by burst errors, that are common in radio communications.

In business environments personal computers and work stations have become commonplace and are beginning to be adopted on a day-to-day basis often taking their place alongside the ubiquitous telephone handset as desk-top furniture. Furthermore, in order to enhance and improve the working relationship between the personal computer and the telephone, many proprietary programs are available for recording information used by executives and office workers on a day-to-day basis, often replacing calendars, diaries and address books etc. Furthermore, with a modem positioned between a personal computer and a telephone line, it is possible for the modem to be used for connecting telephone calls, transmitting data, either point-to-point or by an e-mail provider and to supply facsimiles directly, while maintaining records of communications as and when they take place.

It is accepted that these many different types of communication function extremely well and each may be seen as providing an excellent solution when viewed individually. However, the interaction between these difference services still leaves a lot to be desired. Thus, although it is possible to provide software for establishing telephone calls, sending facsimiles, sending data and accessing larger networks, such as the Internet and pay-by-use networks, procedures must be carefully implemented in order to establish a particular connection and to switch between different connections. Thus, after using a modem for a particular function, say establishing a telephone call, the modem will usually require a degree of reconfiguration in order to access other services, such as data services or facsimiles, before further transmission may take place. Thus, for example, a personal computer may be configured with a facsimile driver, allowing it to receive and transmit facsimiles via its associated modem, but prior to accessing other databases, it may be necessary to remove this driver from memory such that, while communicating with a database it is not possible for the personal computer to receive facsimiles. Thus, it can be seen that in accordance with the present state of the art, the personal computer must still take a back seat when high communication volumes are present, with initial calls usually being made by telephones.

When provided with many types of communication, such as audio telephones, mobile telephones, video transmission and data transmission, it becomes increasingly difficult to identify the precise location of a destination. Existing switching technology will establish physical links between users but this is only effective if a destination user remains in position. Similarly, when switching packets of data, each having destination addresses appended thereto, it is still necessary for the source user to know the destination of the intended recipient. Increasing use has therefore been made of store and forward systems, such as electronic mail, with less reliance being made upon direct real-time communication techniques. A problem associated with modern developments of this type is that these developments in themselves tend to reduce the availability of real-time connections which, to some customers, may in turn reduce the overall effectiveness of a communications scheme.

SUMMARY OF THE INVENTION

According to a first aspect of the invention there is provided a method of establishing communication between a source user and a destination user, wherein data is transmitted between users in packets having a destination address and communication data, comprising steps of: identifying a destination name; transmitting a packet to a service control platform identifying said destination name; returning a packet from said control platform to said source identifying a contactable address for said destination; and generating packets of data at said source for transmission to said destination having said returned address.

In a preferred embodiment, data is transmitted in accordance with Internet-derived protocols. Preferably, a destination name is identified from a displayed list of names. The displayed list of names may be derived from a local database but in a preferred embodiment the displayed list of names is derived from a database held at the service control platform. Preferably, the names data is transmitted to a user when a communication session is initiated, thereby ensuring that said list is regularly updated. The names data may be transmitted as an HTML page.

According to a second aspect of the present invention, there is provided a source user apparatus arranged to receive commands from an operator for establishing communication to a destination user, comprising means for identifying a destination name to a service platform; means for receiving a contactable address from said service platform in response to said identification; and means for supplying packets of data to a destination user identified by said received contactable address.

In a preferred embodiment, the apparatus is connected to a plurality of similar devices via a local network, wherein said network includes a node connected to said service platform. Preferably, an ISDN connection is provided between said node and said platform. Furthermore, transmission between said user apparatus and said service node may be performed in accordance with Internal protocols.

According to a third aspect of the present invention, there is provided a service platform including means for communicating with user terminals and a database containing user addresses comprising means for receiving a user destination address enquiry from a source user; means for accessing said database to obtain a destination address for said destination user; and means for returning details of said destination address to said source user, whereby said source user establishes communication with said destination user by generating data packets using said destination address.

In a preferred embodiment, the gateway to the world-wide web is arranged to receive instructions enabling users to remotely control aspects of the platform's functionality.

THE PREFERRED EMBODIMENT

The invention will now be described by way of example only, with reference to the accompanying drawings identified above.

Figure 1:
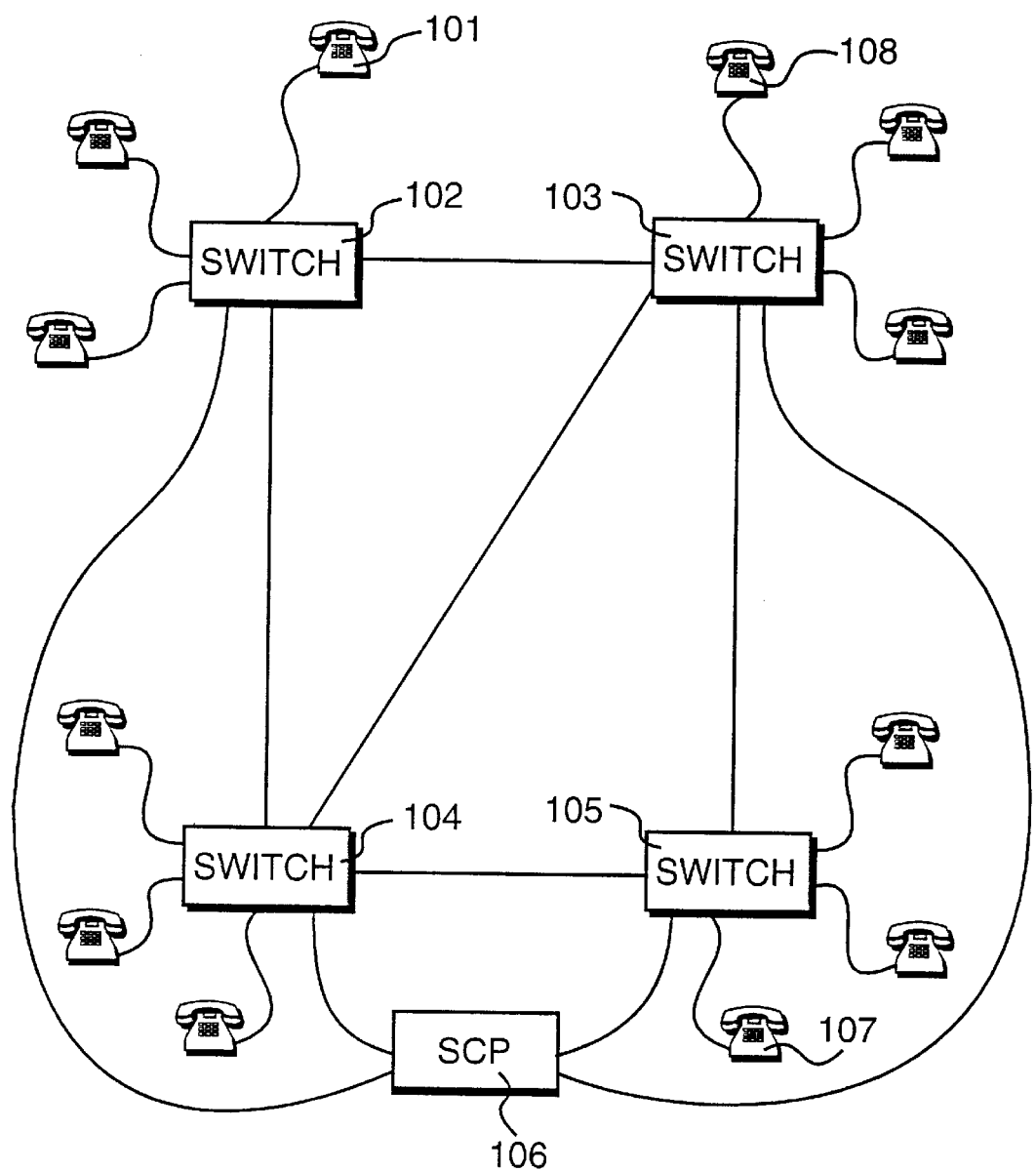
FIG. 1 illustrates a conventional circuit switched network for voice telephony.

A conventional circuit switched environment is shown in FIG. 1, in which telephone handsets, such as handset 101, are connected to switching nodes, such as switching node 102. To initiate a call, signalling information is generated by the telephone handset 101 and this information is relayed to the switching node 102. Intelligent control to effect the switching of signals may be distributed over a network or a high proportion of the control may be centralized, with signalling information being transmitted over common signalling transmission paths. Thus, switching node 102 and a plurality of other switching nodes 103, 104 and 105 may be controlled under a service control point (SCP) 106.

With a network controlled in this way, it is possible to include additional services which, in the art, has become known as an intelligent network. Thus, it is possible for a customer who would normally use telephone handset 107 to convey information to the control processor 106 to the effect that, over a certain period of time, said user would be available at telephone handset 108. Under these conditions, a first customer may supply signalling from telephone handset 101 that is interpreted by switching node 102. This information is relayed to the SCP 106 which in turn has been programmed to recognize this signalling information, so that the call is to be directed to telephone handset 108 in preference to it being directed to telephone handset 107.

A problem with such an arrangement is that the network must include a significant amount of processing capacity in order to perform call redirection of this type. Although a network provider may be in a position to justify the expense of establishing such a network it must also be appreciated that such a network provider is now faced with competition from alternative configurations, therefore the provision of such an investment many not be so attractive in the future.

Figure 2:
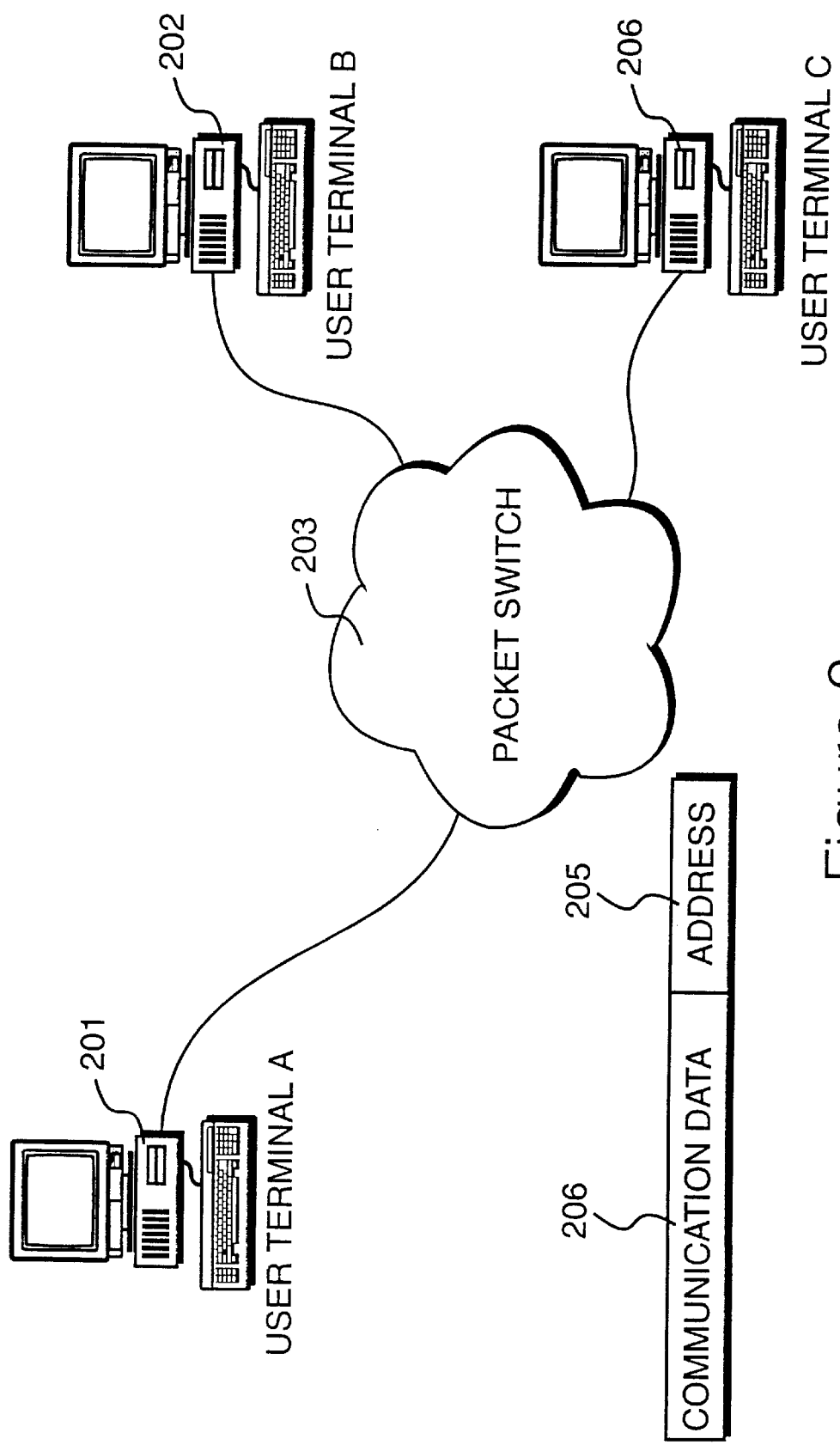
FIG. 2 illustrates a typical packet switched network, such as the internationally recognized "Internet"

An alternative configuration is shown in FIG. 2 in which a source user 201 has data to be transmitted to a destination user 202. The information is transmitted as data packets and the heart of the network may be considered as a packet switch 203.

A typical packet is illustrated generally at 204 consisting of an address portion 205 and a communication data portion 206. User terminal 202 may be identified by an address definable by a source terminal, such as terminal 201. When terminal 201 has communication data for terminals 202, the data is grouped into a plurality of packets and the appropriate address is appended to each packet before said packets are supplied to the packet switch 203. Within the packet switch, usually consisting of a plurality of programmable processing devices, each packet is analyzed and as a result of this analysis, a path is identified thru the network so that, eventually, the packet will be received by user terminal 202. No permanent circuit is established thru the packet switch 203 and each packet must be considered and routed individually. Packet loss is a real possibility and user such environments protocols are usually provided to ensure that information will be relayed back to the transmitting terminals when information has been lost so that lost packets may be retransmitted. Similar protocols may also exist as a mechanism for providing levels of error correction etc.

The Internet represents a highly robust example of the environment shown in FIG. 2. The Internet has been established with its own transmission protocols, including transport control protocol/Internet protocol (TCP/IP) and hypertext transport protocol (HTTP) the use of the latter being recognized by its own sub-set of the Internet under the name "world-wide web" (WWW).

The Internet makes use of distributed processing engines and individual user terminals effectively become part of the network as much as they are user terminals connected to the network. Thus, in order to facilitate the communication of data through the Internet, it is necessary for programs to be executed at user terminals, often referred to as "browsers", such that the overall integrity of the network is highly reliant upon processing facility provided by users themselves.

Many problems are encountered with the Internet but a large proportion of these are due to the limited bandwidth available to most users. Many problems may be overcome by providing higher bandwidth connections and experiments have shown that real-time voice communication and real-time video communication is possible using Internal protocols. The Internet itself has many limitations and although very robust in terms of directing messages to their destination, it is not possible for it to provide any of the "intelligent network" services of the type available within circuit switched environments. Thus, it is not possible for a user normally resident at terminal 202 to provide instructions to the Internet to the effect that on a particular day said user will be resident at terminal 206. The normal arrangement for the Internet is for messages to be held in buffers, in the form of electronic mail and for this mail to be accessed periodically. A user may identify a user name from a different terminal, allowing electronic mail to be accessed, but unless a source user has been informed to the effect that a destination user has moved, it is not possible for a source user to know where a destination user actually resides, therefore it is not possible for the source user to direct information to an alternative location.

Figure 3:
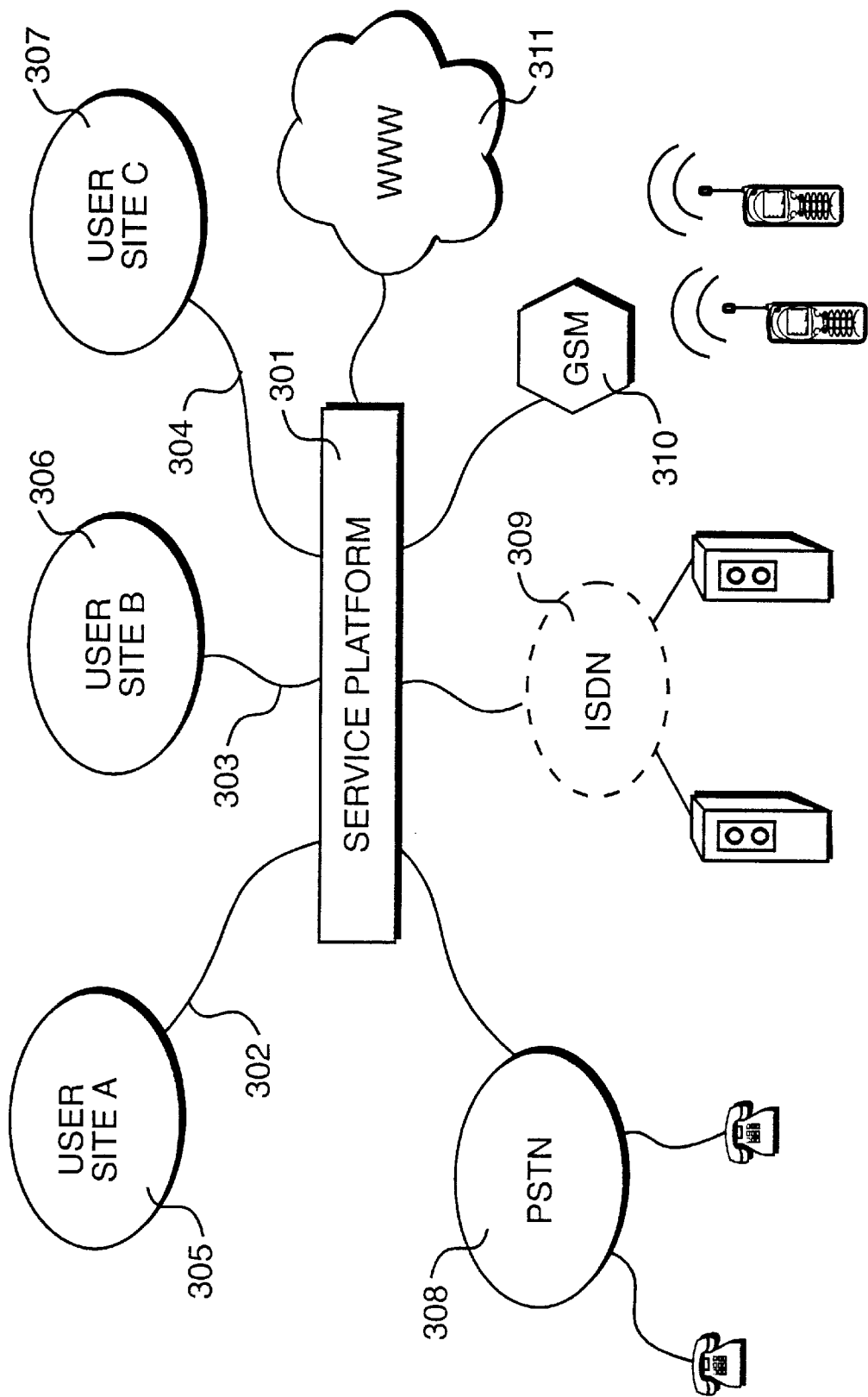
FIG. 3 illustrates a network embodying the present invention, in which a service platform facilitates intercommunication within a plurality of transmission environments, including local networks.

A network embodying the present invention is illustrated in FIG. 3. Much of the network appears similar to the established Internet, in that it makes use of Internet protocols and proprietary servers and browsers. However, the network differs significantly in that the level of band width provided to users is enhanced and communication is overseen by an intelligent service platform, arranged to provide a level of call redirection, by means of associated intelligent protocols.

In accordance with established Internet protocols, information is transmitted in a packet switched environment of the type illustrated in FIG. 2. Within the environment it is possible for a source user to identify the address of a destination user, thereby facilitating the transmission of packets through the network. However, in addition to this basic level of service, it is also possible for calls to be redirected in response to information received from the service platform. However, the service platform does not include conventional circuit switched elements therefore it is not possible for this redirection to be effected using techniques of the type employed within the circuit switched environment illustrated in FIG. 1. Furthermore, given competition from networks such as the Internet, it is not possible for a significant amount of processing power to be effected within the service platform itself and reliance must be made upon the distributed processing power available at user terminals. The invention therefore addresses the problem of how to effect intelligent node-type transmissions within an environment in which the processing capacity is distributed between network elements and user terminals.

As previously states, it is possible for a source user to generate a packet having a destination address such that said packet will be distributed thru the network and received by the addressed destination, in accordance with established Internet protocol techniques. This mechanism is exploited within the present invention in order to establish a connection from a source user to network elements and to addressed customers.

When invoking the inventive procedures, a source user effectively identifies a destination name to the service platform. The service platform is not concerned with establishing a connection to the destination user at this stage. As previously stated, the establishment of a connection of this type must be initiated by the source user in accordance with an intelligent protocol overlaid on established Internet protocols. The service platform therefore analyzes this information, making reference to a database, and in response to this analysis, the service platform returns information back to the source user identifying a contactable address for the previously identified destination. Thus, initially, a source user does not need to know the actual address of the destination user to whom the source user wishes to contact. However, having identified the destination user to the service platform, the address information is returned back to the source user, thereby allowing said source user to assemble new packets in which the true destination user address is identified, thereby allowing packets of communication data may be transmitted to the network with the appropriate address appended thereto.

Thus, the operation of the network illustrated in FIG. 3 is significantly different from the environments illustrated in FIG. 1 and FIG. 2. In the environment shown in FIG. 1, the transmission of data in order to establish a call is effectively a one-way process. In the packet switched environment, such as the Internet, a packet is generated with an address which is then directed to a user. In the circuit switched environment signalling information is supplied to the network resulting in a physical channel being established between the source and the destination. In the present embodiment, the destination address is not initially know. A source user effectively interrogates a service platform by the automatic generation of a message. The service platform then interrogates its database and produces a return message for the source user. The source user will then automatically reassemble new packets with the destination address identified by the service platform.

A further level of complication arises in that although the source user is now aware of the destination address, the source user is not provided with nay information identifying the nature of communications that may take place. The source user will therefore transmit a message to the identified destination effectively asking the destination if it is possible for a communication to be established. When the identified destination is operational, information will be returned back to the source stating firstly that communication is possible and secondly identifying protocols for establishing a communication. Thus, for example, these protocols may state that the destination is capable of invoking a video transmission. Alternatively, the destination may provide information back to the effect that only audio communication is possible.

When this information is returned back to the source user, the source user is now in a position to generate packets of communication data that are meaningful to the identified destination. Thus, transmission of these packets will be initiated and a communication channel will have been created between the source user and the destination user.

With information being received by the destination user, this information will include addressing information so that the destination user may in turn return information back to the source user. Thus, in this way, it is possible to establish a full duplex two-way communication between the initiating source user and the receiving destination user.

In addition to allowing communications to be established in this way, the service platform 301 is also capable of providing additional functionality. Customers of the particular service will be provided with a relatively high bandwidth digital communication link, such as an ISDN channel 302, 303 and 304 to respective user sites 305, 306, 307 etc. Each user site will take the form of a local area network allowing a plurality of individual users to gain access to the user port. In this way, a user at site 305 may request a connection to a user normally resident at site 306. However, the user at site 306 may have instructed the service platform to the effect that on a particular day he will be resident at site 307. Under these circumstances the user's name remains unchanged but the user's address is modified in the database, resulting in messages being directed immediately to the new destination location.

Under some circumstances users may be unavailable and therefore the service platform provides an option for data messages, voice messages, fax messages and electronic mail etc to be stored within the platform for later retrieval. Furthermore, messages may be retrieved using the established service connections (302, 304, 304 etc). Alternatively, different means of access may be provided, such as the established world-wide web, as described in the applicant's co-pending British Patent Application No. 9526 326. In particular, such a connection would facilitate the setting-up of call redistribution strategies and the retrieval of stored messages.

In the embodiment shown in FIG. 3 further functionality is provided by giving access to established communication systems operating under their own distinct protocols. In this way, it is possible for the service platform to gain access to the public switched telephone network (PSTN) 308, conventional ISDN networks 309, cellular networks such as GSM 301 and other packet switched networks such as the world-wide web 311. Furthermore, access may also be provided in the opposite direction such that users of the PSTN, ISDN, GSM or WWW may access service users at any of the available sites 305, 306 or 307.

Figure 4:
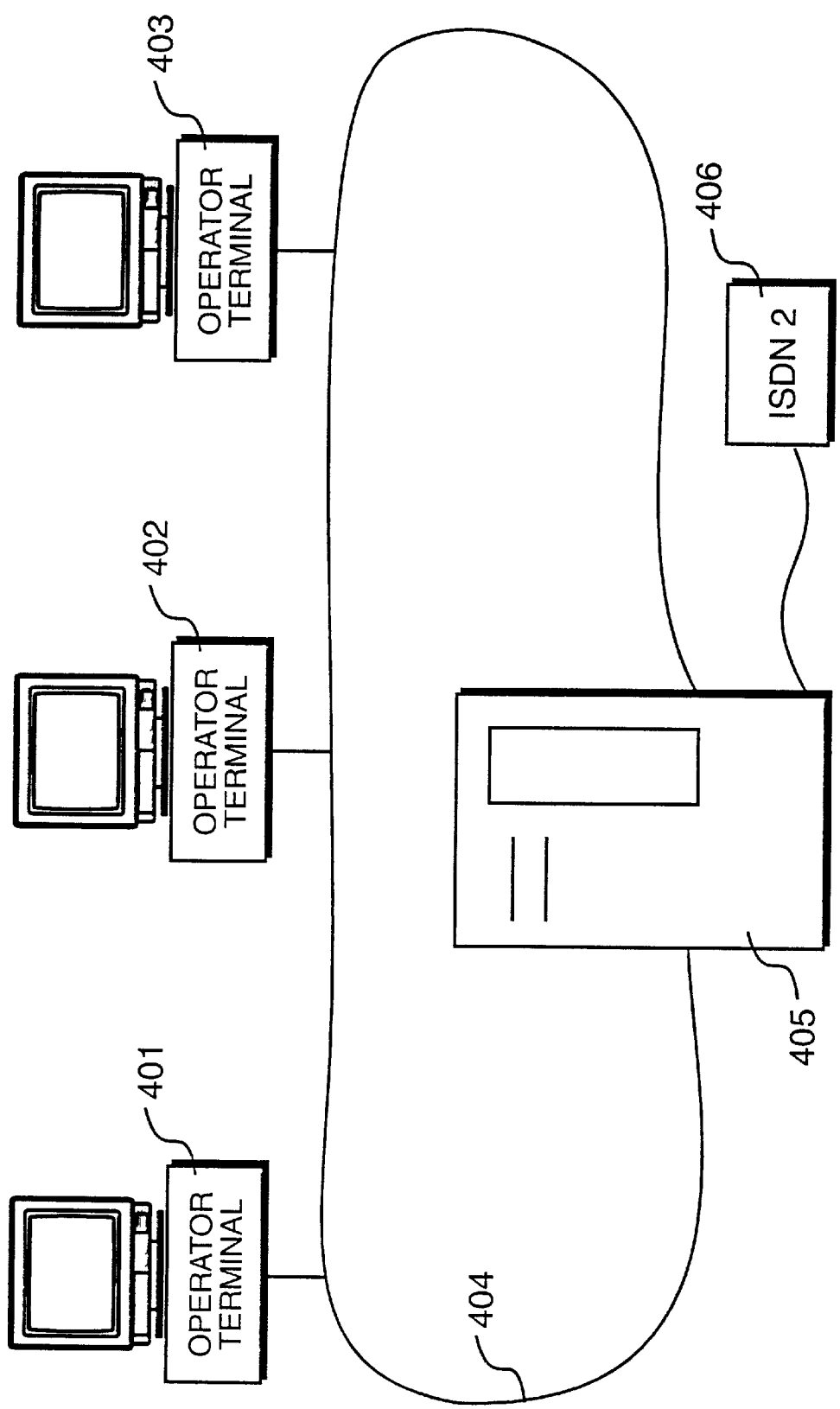
FIG. 4 details a local network of the type illustrated in FIG. 3.

A typical user site, such as user site 305, is illustrated in FIG. 4. A plurality of terminals 401, 402 and 403 are connected to a local area network 404, such as an Ethernet or an ATM network. The network is also connected to a network server 405, which in turn provides access to the service platform 301 over connection 302 via an ISDN 2 interface 406.

The local area network 404 is configured to allow the transmission of packets in accordance with the Internet protocol such that a terminal 401 may generate a TCP/IP address for another terminal connected to its local network 404. Similarly, addresses may be identified for other user sites 306, 307 and addresses may be generated for other environments 308 to 311. A system is configured such that the actual location of a destination is substantially transparent to operators and simple user operations allow connections to be made anywhere within the service world, as illustrated in FIG. 3.

At this stage it is important to appreciate the distinction between manual operations being made by actual people, who hereinafter will be referred to as "operators" and the automated processing operations performed by operator's terminals, which will hereinafter be referred to as "terminals". Similarly, a plurality of terminals are connected together on the local area network such that, in combination with their server, they represent a user as perceived by the service platform 301, resident at a particular user site, such as site 305, 306 or 307.

Figure 5:
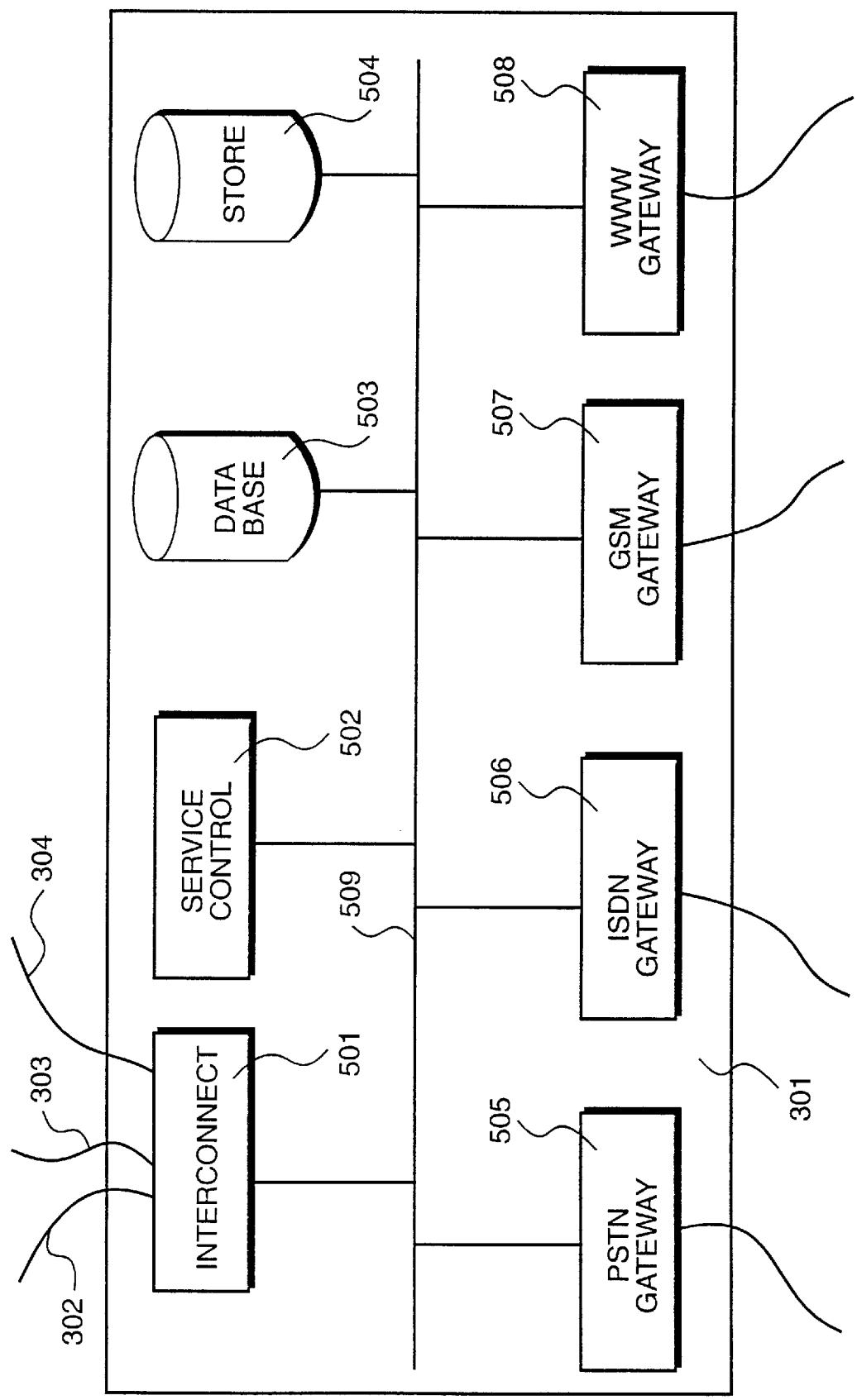
FIG. 5 details the service platform illustrated in FIG. 3.

Service platform 301 is illustrated in FIG. 5, consisting of an interconnection circuit 501, a service control node 502, a database 503, a message store 504, a PSTN gateway 505, an ISDN gateway 506, a GSM gateway 507 and a WWW gateway 508. Circuits 501 to 508 communicate over an ATM local area network 509, operated under the control of the service control node 502, embodied as a substantial unix processing environment.

Interconnection circuit 501 provides a physical interface for ISDN transmissions over communication paths 302, 303 and 304. The interconnection circuit is responsible for receiving ISDN transmissions and modifying such transmissions so as to place them in a form suitable for being supplied to the service control processor 502. Similarly, the interconnection circuit 501 receives transmissions from the service control processor 502 and modifies these for transmission over the ISDN connections 502 to 504. The interconnection circuit 501 also facilitates the mutual connection of service users, thereby allowing users to communicate with established TCP/IP protocols. Thus the processing facility available at user sites is exploited without placing a processing burden upon the available processing resource provided by the service platform. In this way, the level of processing availability at the service platform may be substantially reduced, thereby making the communication environment highly competitive.

Three distinct modes may be identified for allowing a connection to be established. First of all, a terminal may generate the address of another terminal, possibly with reference to a locally stored directory, such that the transmission may be contained solely within the local network, such as network 404 or alternatively, after being received on, say, ISDN connection 302, the communication is redirected by the interconnection circuit 501 to an alternative ISDN channel, such as 304 for use within user site 307. Under these circumstances effectively no use is made of the service platform at all and transmission addressing is controlled exclusively by user equipments.

Under the second mode of operation, an operator may identify a destination name resulting in that operator's respective terminal generating an address which supplies a packet of data to the service control node 501, via the interconnection circuit 501. At the service control node 502 the user required is identified, resulting in the database 503 being accessed. In response to information received from the database 503, it is then possible for the service control node 502 to identify the real destination address of the calling user, which again may be a user resident within site 307. This information is returned back over communications path 302 where it is processed by an operator terminal, such as terminal 401. The human operator is effectively unaware of this communication and the terminal 401 will automatically create a new packet of information including the address supplied to it from the service control node 502. In this way, it is now possible for the terminal 401 to generate new packets having a real destination address appended thereto. Thus, having now received this information it is possible for a communication of the second type to be performed substantially in accordance with said communication of the first type. In particularly, a packet of information is supplied to the interconnection circuit 501 and then immediately redirected back out to user site 307, without further recourse to the service control processor 502.

Under a third mode of operation an operator will again identify a particular destination name, resulting in their respective terminal generating a packet of information destined for the service control node 502. Under control of the service control processor 502, information is retrieved from the database 503 thereby enabling the service control processor 502 to assemble a packet of information which is retransmitted back to the terminal 401, effectively identifying the true address of the destination. On this occasion however the destination is not an actual customer of the service or, alternatively, the customer has instructed the service platform to the effect that calls should be redirected to other transmission environments. Under these circumstances, the address data will identify an address for a particular gateway 505 to 508, with additional addressing information appended thereto which is acted upon by the gateway itself thereby allowing a call to be connected through the PSTN, ISDN, GSM or WWW etc. Thus, under these circumstances, the terminal 401 generates packets of information in the usual way which are directed to the appropriate gateway via the interconnection circuit 501. This places additional traffic on the ATM network 509 but again it does not make reliance upon the service control processor 502. At the selected gateway, the addressing information is identified thereby allowing a call to be set up within the appropriate environment and thereafter a protocol conversion occurs such that, for example, speech data generated by a user site and transmitted in the form of packets is assembled into a continuous stream and converted into a PCM stream or analog speech for transmission through the PSTN. Similarly, conversions of this type will take place for transmission through the ISDN 309, the GSM 310 or the WWW 311, the latter requiring substantially less conversion given that similar protocols are being exploited.

The service platform 301 is not part of the established "Internet", but does make use of protocols established for the Internet and terminals 401 execute TCP/IP based HTML "browsers". Communication between the service control processor 502 and the individual terminals, such as terminal 401, is effected using HTTP for service presentation and the service control processor 502 is associated with an HTTP daemon (HTTPD).

When connected to the service, an operator is in a position to effect all communications via his service terminal. Consequently, it is not necessary to provide operators with separate telephones, connected to internal private exchanges and ultimately the established PSTN, given that it is possible to achieve connection to the PSTN 308 via the service platform 301. Furthermore, it is not necessary for individual operators to make special provision for achieving communications of specific types. In particular, operators are provided with tailored directories allowing them to quickly establish communications to other local operators, remote operators and ultimately anyone connected to any type of network which in turn has access to the service platform 301 via an appropriate gateway. It is therefore envisaged that operator terminals would initiate their operation in a mode suitable for effecting communications. This is particularly attractive given that operators would regularly look to see whether they have any electronic mail messages or other stored messages before commencing other tasks. These other tasks may then be performed, often using unrelated applications, with the communication application possibly residing as a background process, particularly in multi-tasking environments such as Unix or Windows 95. Thus, although active in other tasks using other applications, local browsers will remain operational, thereby alerting operators to incoming calls and allowing them to take appropriate action. Thus, the terminal provides an operator with the sole means of access both to local communications, regional communications and ultimately world-wide communications.

An operator would normally active a terminal, which will then result in automatic execution of a stored program or script to facilitate connection to the communications service. In this way, activation of the terminals results in a message being sent to the service control processor 502 notifying said processor to the effect than an operated terminal is now active.

Figure 6:
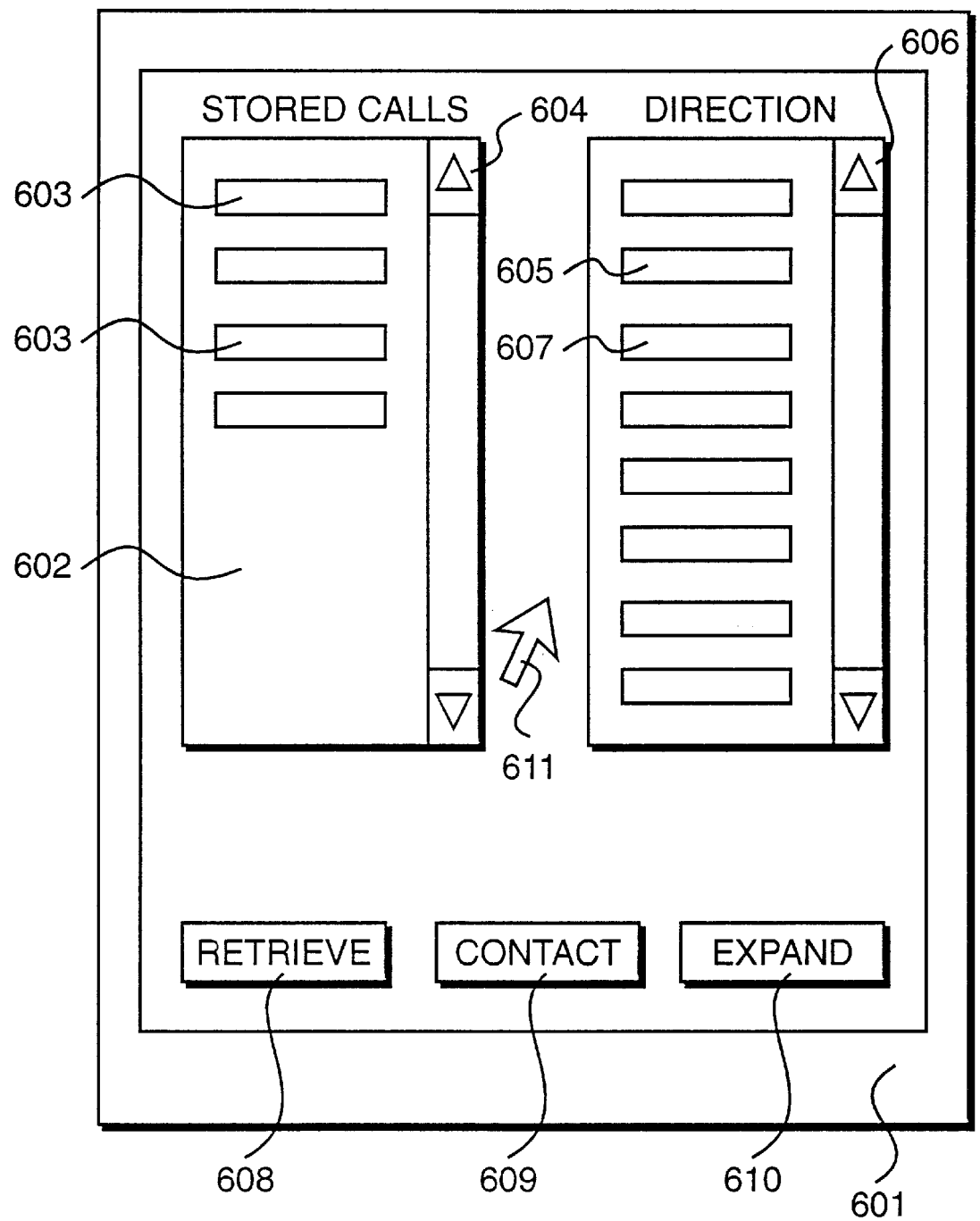
FIG. 6 illustrates a user display having a page of data displayed thereon.

The HTTPD associated with the service control processor 502 executes a script to supply a customized page of HTML back to the operator terminal resulting in a graphical image being displayed to the operator on a visual display unit, such as unit 601 shown in FIG. 6. The page generated by the HTTPD contains user specific information derived from the database 503 and includes a window 602 showing information identifying the existence of individual stored calls 603. These are calls that have been directed to the operator while said operator's terminal has been inactive. These calls may be voice calls, e-mail or any other type of transmittable data, such as facsimile transmissions. The window includes a scroll bar 604, as are well known in windows environments.

A similar window 605, having similar scroll bar 606, identifies a directory of names specified by the operator to facilitate rapid connection to regularly called destinations. A private directory of this type many be known colloquially as a "buddy-list" and identifies frequently called destinations; these usually being ones with whom the operator maintains friendly relations. Thus, individual entries 607 are displayed within the directory and the totality of these entries may be expanded by manual operation effected by the operator.

The page displayed by the display unit 601 also includes soft buttons, consisting of a retrieve button 608, a contact button 609 and an expand button 610. These buttons are accessed via manual operation of a control device, frequently a mouse, which in turn adjusts the position of a displayed curser arrow 611. The provision of a mouse and its associated curser allows stored calls to be retrieved and directory entries to be contacted. Operation of this type would consist of moving the curser 611 to a position indemnifying one of the stored call entries 603. The left mouse button is then activated and selection of the entry would then be identified by a changing color. Further manual operation of the mouse results in the curser 611 being directed to the retrieve button 608. Again depression of the appropriate mouse button while the curser is positioned over the retrieve button 608 results in the selected call being retrieved from store. This may take the form of an audio signal supplied to suitable equipment. Alternatively, facsimile information may be displayed or other types of stored data may be made accessible. The storing of facsimile information of this type is substantially similar to that described in the applicant's previously identified co-pending application.

A similar mechanism is employed for selecting directory entries by moving the curser 601 to the appropriate entry 605 and activating the contact button 609. Once activated in this way the packet is assembled by the terminal and transmitted to the service control processor 502.

The third soft button 610 allows other features to be accessed via an expand function. In this way, functions for adding entries to the directory, accessing central directories, such as business and residential phone books or classified directories and the modification of preferences may be accessed. The expand button also facilitates closure of the particular function but as previously stated, the system is designed such that the procedures would remain active as a background process thereby allowing communications to be established while an operator is engaged in other tasks.

Figure 7:
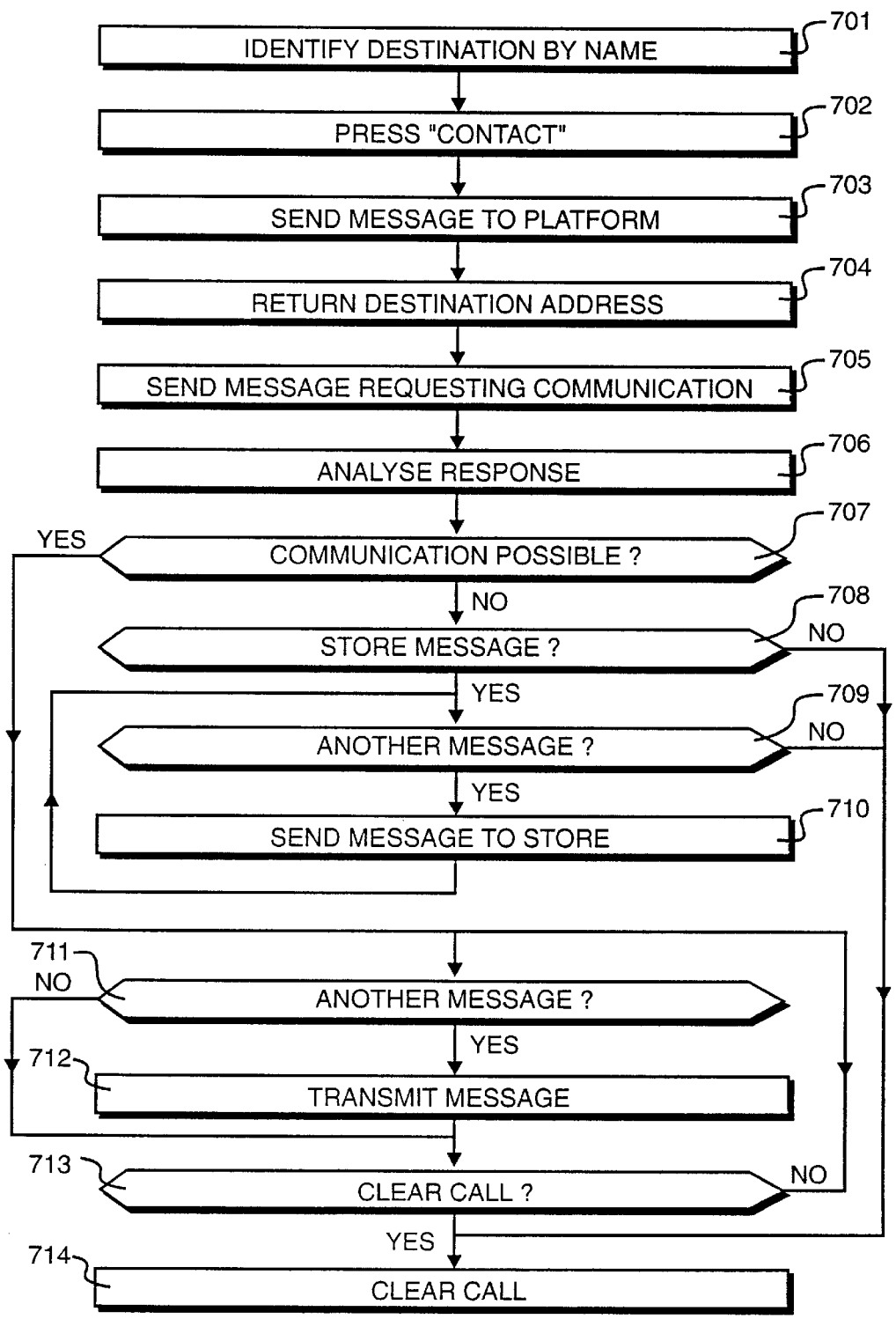
FIG. 7 illustrates operation of the network shown in FIG. 3.

Procedures for effecting a call between users, making use of the service control processor 502, is detailed in FIG. 7. At step 701 a destination is identified by name from the directory whereafter the "contact button" 609 is activated at step 702. These procedures are effected manually be the operator as previously described and thereafter no further involvement is required on the part of the operator except for the generation of source information, possibly in the form of a voice communication.

At step 703 the operator's terminal sends a message to the service control processor 502 of the platform 301 which in turn returns a destination address to the terminal at step 704.

At step 705 the terminal generates a new message to the destination, using the address returned from the service control processor 502, with a message requesting a communication to be established.

The message is transmitted to the destination, either directly through the interconnection of circuit 501 or via an appropriate gateway, resulting in an analysis of the message being made by the destination terminal at step 706.

At step 707 a question is asked as to whether communication is possible and if answered in the negative a question is asked at step 708 as to whether the source operator wishes to store a message. Under these circumstances a new HTML page will be generated by the service control processor 502 and supplied to the operator terminal. This would displace soft buttons of the form "Yes" and "No", requiring further manual operation on the part of the operator. When the operator answers in the affirmative a question is asked of the terminal as to whether another message is present; it being noted that messages are now being considered as discrete packets so the question asked at step 709 is effectively asking whether the message, as perceived by the operator, requires another packet to be transmitted for the transmission of the total message to be completed. When answered in the affirmative the next packet is sent at step 710 and control is returned to step 709. Thus, messages in the form of packets continue to be transmitted until the question asked at step 709 is answered in the negative resulting in the call being cleared at step 714.

If the question asked at step 707 is answered in the affirmative, to the effect that communication is possible, control is directed to step 711. At step 711 a question is asked as to whether another message is present and when answered in the affirmative the message is transmitted at step 712. When all the packets have been transmitted the question asked at step 711 is answered in the negative and control is directed to step 713. At step 713 a question is asked as to whether the call is to be cleared which will be answered in the affirmative if not further communication is required. However, it is likely that the called party will require messages to be transmitted, resulting in the question asked at step 713 being answered in the negative. Eventually, communication in both directions will have been completed resulting in the question asked at step 713 being answered in the affirmative with the call then being cleared at step 714.

What is claimed is:

1. A method of establishing data transmission, from a source terminal connected to one of a plurality of communications networks, to a desired recipient at a contactable address on another of the plurality of communications networks, each of the networks being connected via a respective gateway to a service control platform, and wherein the data is transmitted in packets having a destination address portion and communication data portion, the method comprising the steps of:

providing at the source terminal a name identifying the desired recipient for the data;

transmitting, from the source terminal to the service control platform, a name-to-address translation request packet containing in its communication data portion the provided name;

receiving the translation request packet at the service control platform and, in response, accessing a name-to-address translation database in accordance with the provided name and, upon finding a match, retrieving address data currently stored in association with that name;

transmitting a name-to-address translation reply packet from said control platform to said source terminal, the translation reply packet containing in its communication data portion the contactable address for the desired recipient comprising a network address portion and a gateway address portion; and in response to receipt of the translation reply packet at the source terminal, transmitting the data from said source terminal in packets, the destination address portion of each such packet containing the contactable address.

2. A method according to claim 1, wherein the packets are transmitted in accordance with Internet-derived protocols.

3. A method according to claim 1, wherein the providing step comprises selecting the name of the desired recipient from a list of names displayed on the source terminal.

4. A method according to claim 3, wherein the providing step comprises a substep of deriving said list of names from a database held at the service control platform.

5. A method according to claim 4, including the steps of automatically sending a service connection request from the source terminal to the service control platform upon activation of the source terminal and, in response, transmitting names data to the source terminal.

6. A method according to claim 4, wherein said names data is transmitted as an HTML page.

7. A method according to claim 1, wherein said another of the plurality of communications networks is a PSTN, ISDN, GSM or WWW network.

8. An apparatus arranged for connection to a network, and for receiving commands from an operator for sending data to a desired recipient at a contactable address, comprising:

means responsive to the input by the operator of the name of a desired recipient for generating a name-to-address translation request packet comprising a communication data portion containing the desired recipient name, and for transmitting the generated name-to-address translation request packet via a gateway to a service control platform;

means responsive to receipt of a name-to-address translation reply packet containing in its communication data portion a contactable address comprising a network address and a gateway address, for retrieving the contactable address therefrom; and means for generating, for transmission, packets of data, the destination address portion of each such packet having first and second subportions, the first subportion containing the retrieved network address, and the second subportion containing the retrieved gateway address.

9. Apparatus according to claim 8, wherein the name-to-address translation request packet generating means and the contactable address retrieval means are arranged to operate in accordance with Internet protocols.

10. Apparatus according to claim 8, including a multi-tasking environment, one of the tasks being the reception of messages from the service platform, whereby such messages can be received while the apparatus is active regardless of whether any other task is being performed by the apparatus.

11. Apparatus according to claim 8, wherein said user apparatus executes a hyper-text transport protocol browser.

12. An apparatus according to claim 11, arranged to receive names data in the form of an HTML page and to display that page, and responsive to selection of a name from that page by the operator to supply the selected name to the name-to-address translation request packet generating means.

13. Apparatus according to claim 8, and arranged to respond to activation by an operator by automatically sending a service connection request addressed to the service control platform.

14. A network comprising a plurality of apparatuses according to claim 8 connected to a local network, and a gateway node also connected to the local network, the gateway node having an output for connection to said service control platform.

15. A network according to claim 14, wherein said output conforms to ISDN transmission standard.

16. An apparatus for providing a source terminal with a contactable address for a desired recipient for data to be sent by the source terminal, the apparatus comprising;

means for receiving from a source terminal a name-to-address translation request packet containing in its communication data portion a name identifying a desired recipient for the data;

a name-to-address translation database in which entries comprise a name and an associated contactable address, each associated contactable address having a first part in the form of a network address and a second part in the form of a gateway address;

means for accessing the name-to-address translation database in accordance with the name identifying a desired recipient to obtain the associated contactable address of an entry having a name matching the name identifying a desired recipient; and means for generating a name-to-address translation reply packet for transmission to the source terminal, the translation reply packet containing in its communication data portion the obtained associated contactable address for the desired recipient.

17. An apparatus according to claim 16, wherein said means for accessing said database includes an ATM network.

18. An apparatus according to claim 16, including respective gateways to a plurality of communications environments.

19. An apparatus according to claim 18, wherein said gateways are gateways to PSTN, ISDN and GSM networks.

20. An apparatus according to claim 18, wherein one of said gateways is a gateway to the established world-wide web.

21. An apparatus according to claim 20, wherein said gateway to the world-wide web is arranged to receive instructions enabling a destination terminal to remotely control aspects of the apparatus' functionality.

* * * * *